US011356283B2

(12) United States Patent
Schnabel

(10) Patent No.: US 11,356,283 B2
(45) Date of Patent: Jun. 7, 2022

(54) DATA STORAGE USING AN ENCRYPTION KEY WITH A TIME EXPIRATION ASSOCIATED THEREWITH

(71) Applicant: Seagate Technology LLC, Cupertino, CA (US)

(72) Inventor: Dieter P. Schnabel, Erie, CO (US)

(73) Assignee: Seagate Technology LLC, Fremont, CA (US)

(*) Notice: Subject to any disclaimer, the term of this patent is extended or adjusted under 35 U.S.C. 154(b) by 302 days.

(21) Appl. No.: 16/406,717

(22) Filed: May 8, 2019

(65) Prior Publication Data

US 2020/0358624 A1 Nov. 12, 2020

(51) Int. Cl.
*H04L 9/32* (2006.01)
*H04L 9/08* (2006.01)
*G06F 21/60* (2013.01)

(52) U.S. Cl.
CPC .......... *H04L 9/3268* (2013.01); *G06F 21/602* (2013.01); *H04L 9/0872* (2013.01); *H04L 9/3297* (2013.01)

(58) Field of Classification Search
CPC ... H04L 9/3268; H04L 9/0872; H04L 9/3297; H04L 2209/38; H04L 9/3239; G06F 21/602; G06F 17/40; G06F 2221/2137
See application file for complete search history.

(56) References Cited

U.S. PATENT DOCUMENTS

| | | | | |
|---|---|---|---|---|
| 7,770,008 B2* | 8/2010 | Walmsley | ............. | G06F 21/575 713/168 |
| 7,930,493 B1* | 4/2011 | McGovern | ............ | G06F 3/0643 711/159 |
| 8,429,420 B1* | 4/2013 | Melvin | ................... | G06F 21/79 713/189 |
| 8,769,304 B2* | 7/2014 | Kirsch | .................... | H04L 63/08 713/183 |
| 8,776,216 B2* | 7/2014 | Boccon-Gibod | ... | H04L 63/0428 726/21 |
| 10,171,251 B2* | 1/2019 | Kreft | ......................... | H04L 9/14 |
| 10,581,617 B2* | 3/2020 | Khosravi | .............. | H04L 9/3263 |
| 2007/0204335 A1* | 8/2007 | Zugenmaier | ............ | G06F 21/79 726/9 |
| 2012/0324242 A1* | 12/2012 | Kirsch | ............... | G06Q 30/0609 713/189 |

(Continued)

*Primary Examiner* — J. Brant Murphy
(74) *Attorney, Agent, or Firm* — Mueting Raasch Group

(57) ABSTRACT

A system includes a storage unit, a trusted time source, a key generation unit, and an encryption unit. The storage unit is configured to store data. The trusted time source provides a correct time responsive to a request. The key generation unit receives a time expiration associated with the data stored on the storage unit. The time expiration indicates when the data stored on the storage unit is to become inaccessible. The key generation unit further receives the correct time from the trusted time source and generates an encryption key based on the correct time and further based on the time expiration. The encryption unit is configured uses the encryption key to encrypt the data stored on the storage unit. A certificate that includes the time expiration and a decryption key associated with the encryption key is generated responsive to the data stored on the storage unit being encrypted.

17 Claims, 5 Drawing Sheets

(56) References Cited

U.S. PATENT DOCUMENTS

| | | | | |
|---|---|---|---|---|
| 2013/0132718 | A1* | 5/2013 | Agrawal | H04L 9/3268 713/158 |
| 2016/0070474 | A1* | 3/2016 | Yu | G06F 3/0631 711/103 |
| 2017/0185789 | A1* | 6/2017 | Khosravi | G06F 21/6209 |
| 2017/0230179 | A1* | 8/2017 | Mannan | H04L 9/3226 |
| 2019/0052456 | A1* | 2/2019 | Bygrave | H04L 9/3268 |

* cited by examiner

DATA STORAGE USING AN ENCRYPTION KEY WITH A TIME EXPIRATION ASSOCIATED THEREWITH

SUMMARY

Provided herein is a system that includes a storage unit, a trusted time source, a key generation unit, and an encryption unit. The storage unit is configured to store data. The trusted time source is configured to provide a correct time responsive to a request. The key generation unit is configured to receive a time expiration associated with the data stored on the storage unit. The time expiration indicates when the data stored on the storage unit is to become inaccessible. The key generation unit is further configured to receive the correct time from the trusted time source and generate an encryption key based on the correct time and further based on the time expiration. The encryption unit is configured to use the encryption key to encrypt the data stored on the storage unit. A certificate that includes the time expiration and a decryption key associated with the encryption key is generated responsive to the data stored on the storage unit being encrypted.

These and other features and advantages will be apparent from a reading of the following detailed description.

DESCRIPTION

Figure 1:
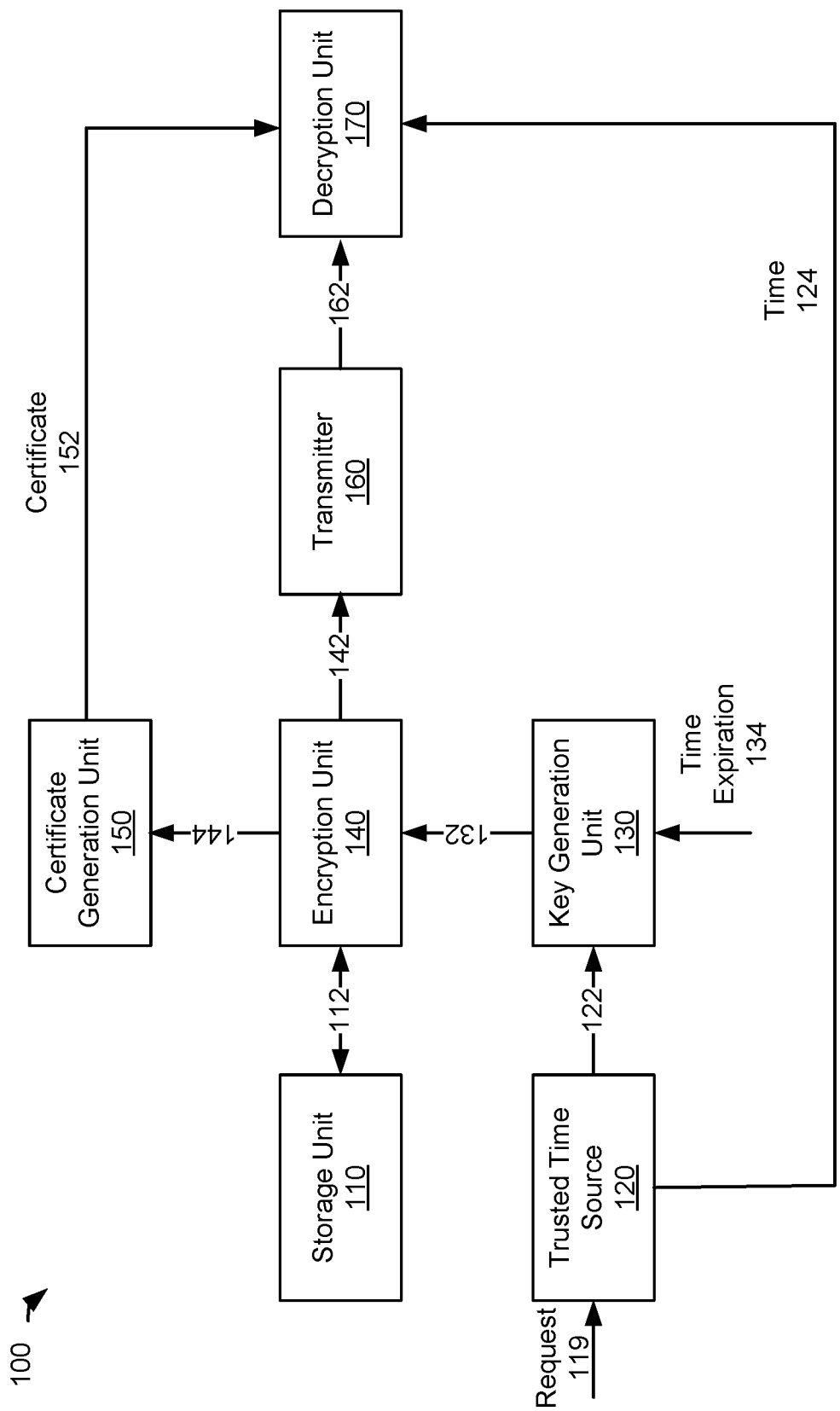
FIG. 1 shows a system for generating an encryption key for encrypting data that expires after a certain period of time according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device or a processor. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "decrypting," "encrypting," "processing," "updating," "instantiating," "invalidating," "deleting," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

There are instances in which one may wish to maintain and make stored data available for a certain period of time. For example, data retention is a policy at many companies where the data is stored for a certain amount of time. It is also appreciated that there are instances in which one may wish to delete the data or to make the data inaccessible after a certain period of time. For example, during litigation there is often a data retention hold on certain documents and upon the conclusion of the litigation the owner of the data may wish to delete the data or make the data otherwise inaccessible. Making the data available only for a certain period of time and thereafter deleting it or making the data inaccessible may be referred to as time bomb associated with the stored data.

The embodiments described herein generate an encryption key with a time expiration associated therewith. Accordingly, the encrypted data is only accessible before the time expiration. After time expiration the data may be deleted or otherwise become inaccessible by deactivating or invalidating the encryption/decryption key.

Moreover, growing concerns over data and privacy have increased the importance of protecting and tracking the data. For example, it may be important to track when a particular data is being accessed, encrypted, decrypted, modified, deleted, etc. In some embodiments, a block chain technology may be utilized to track when data is being accessed, encrypted, decrypted, modified, deleted, etc. In other words, activities associated with data may be tracked and encrypted into a block within a block chain. Block chain may be shared with various nodes within the network, e.g., a storage medium enterprise system, one or more processing entities, etc., in a cryptographically secure manner. According to some embodiments, new data activity, e.g., access request, access grant, access failure, encryption, decryption, etc., may be encrypted and appended to the end of the block chain and prevent prior data activity within the block chain from being modified. As such, any data activity generated or processed, whether public/private, can be tracked and cannot be modified without breaking the block chain. It is appreciated that in some embodiments a layered block chain may be used where more sensitive data, e.g., private information, may be encrypted in such a fashion that the data is not visible to public or an unauthorized user while encrypting non sensitive data in such as fashion that makes the data visible to public.

Referring now to FIG. 1, a system for generating an encryption key for encrypting data that expires after a certain period of time according to one aspect of the present embodiments is shown. System 100 includes a storage unit 110, a trusted time source 120, a key generation unit 130, an encryption unit 140, a certificate generation unit 150, a transmitter 160, and a decryption unit 170. It is appreciated that the data stored within the storage unit 110 is accessible via the system 100. Accordingly, the encryption unit 140, the key generation unit 130, and the decryption unit 170 are closely tied.

According to some embodiments, the storage unit 110 may include one or more hard drives and/or one or more solid state drives or it may be an enterprise unit. The storage unit 110 is configured to store data. It is appreciated that the stored data may be any data, e.g., business data with a data retention policy, data related to a litigation with litigation hold, etc. The stored data 112 in the storage unit 110 may be transmitted to the encryption unit 140.

The key generation unit 130 is configured to generate an encryption key for the encryption unit 140. It is appreciated that the key generation unit 130 may receive a time expiration 134. The time expiration 134 indicates when data should become inaccessible, e.g., encryption/decryption key becoming inactive, data deleted, etc. In some embodiments, the time expiration 134 is user selectable and received from a user, e.g., via a graphical user interface (GUI). It is appreciated that the key generation unit 130 may also receive a correct time 122 from the trusted time source 120. The correct time 122 is a universally guaranteed correct time and it may be received through stamp protocol such as RFC3161, PKI time stamp protocol, etc. It is appreciated that in some embodiments, the correct time 122 may be received in response to a request 119, e.g., from the key generation unit 130, from the storage unit 110, from the encryption unit 140, etc., and after a connection with the trusted time source 120 is established using a digital certificate. The digital certificate may be generated by the certificate generation unit 150 in some embodiments. It is appreciated that the key generation unit 130 is configured to generate an encryption/decryption key after it receives the time expiration 134 and the correct time 122. The encryption/decryption key 132 generated by the key generation unit 130 may be transmitted to the encryption unit 140. It is further appreciated that the encryption/decryption key generated by the key generation unit 130 includes the time expiration (or time stamp) upon expiration of which the data encrypted with the encryption/decryption key become inaccessible, e.g., by invaliding the encryption/decryption key, by deleting the data that is encrypted, etc.

The encryption unit 140 receives the encryption/decryption key 132 and encrypts the data 112 received from the storage unit 110. As such, the encrypted data becomes inaccessible, e.g., by deleting the data, by disabling the encryption/decryption key, etc., after the expiration of the time expiration 134. The encryption unit 140 in some embodiments transmits the encryption/decryption key 144 to the certificate generation unit 150. The certificate generation unit 150 generates a certificate 152 that includes the encryption/decryption key. The certificate 152 may be transmitted to a user requesting to access the stored data, e.g., decryption unit 170. It is appreciated that in some embodiments, the certificate generation unit 150 may receive the encryption/decryption key from a different component, e.g., key generation unit 130, etc.

In some embodiments, the encrypted data may be stored in the storage unit 110 and upon a request from the decryption unit 170 may be fetched and transmitted via the transmitter 160 to the decryption unit 170.

The decryption unit 170 receives the certificate 152 from the certificate generation unit 150 and the decryption unit 170 further receives the encrypted data 162 from the transmitter 160. During the decryption process, the decryption unit 170 requests for the current correct time 124 from the trusted time source 120. It is appreciated that while the trusted time source 120 used by the key generation unit 130 and the decryption unit 170 is shown as being the same, the embodiments should not be construed to be limited thereto. For example, different trusted time sources may be used by the key generation unit 130 and the decryption unit 170. The decryption unit 170, therefore, receives the current correct time and compares that time to the expiration time 134 received in the encryption/decryption key within the certificate 152. If the current correct time is before the time expiration 134 indicated within the encryption/decryption key of the certificate 152, the decryption unit 170 can use the decryption key to decrypt the received encrypted data 162. On the other hand, if the current correct time is after the time expiration 134 indicated within the encryption/decryption key of the certificate 152, the decryption unit 170 cannot decrypt the encrypted data 162, e.g., because the encryption/decryption key may be inactive.

In some embodiments, after the expiration of the time expiration 134, the encrypted data is deleted from the storage unit 110. As such, when the decryption unit 170 requests access to the encrypted data, even though it has received the certificate 152, it receives no encrypted data since the data has been deleted. Thus, the data becomes inaccessible after the expiration of the time expiration 134.

Accordingly, the encrypted data is only accessible before the expiration of the time expiration. After time expiration the data may be deleted or otherwise become inaccessible by deactivating or invalidating the encryption/decryption key.

Figure 2:
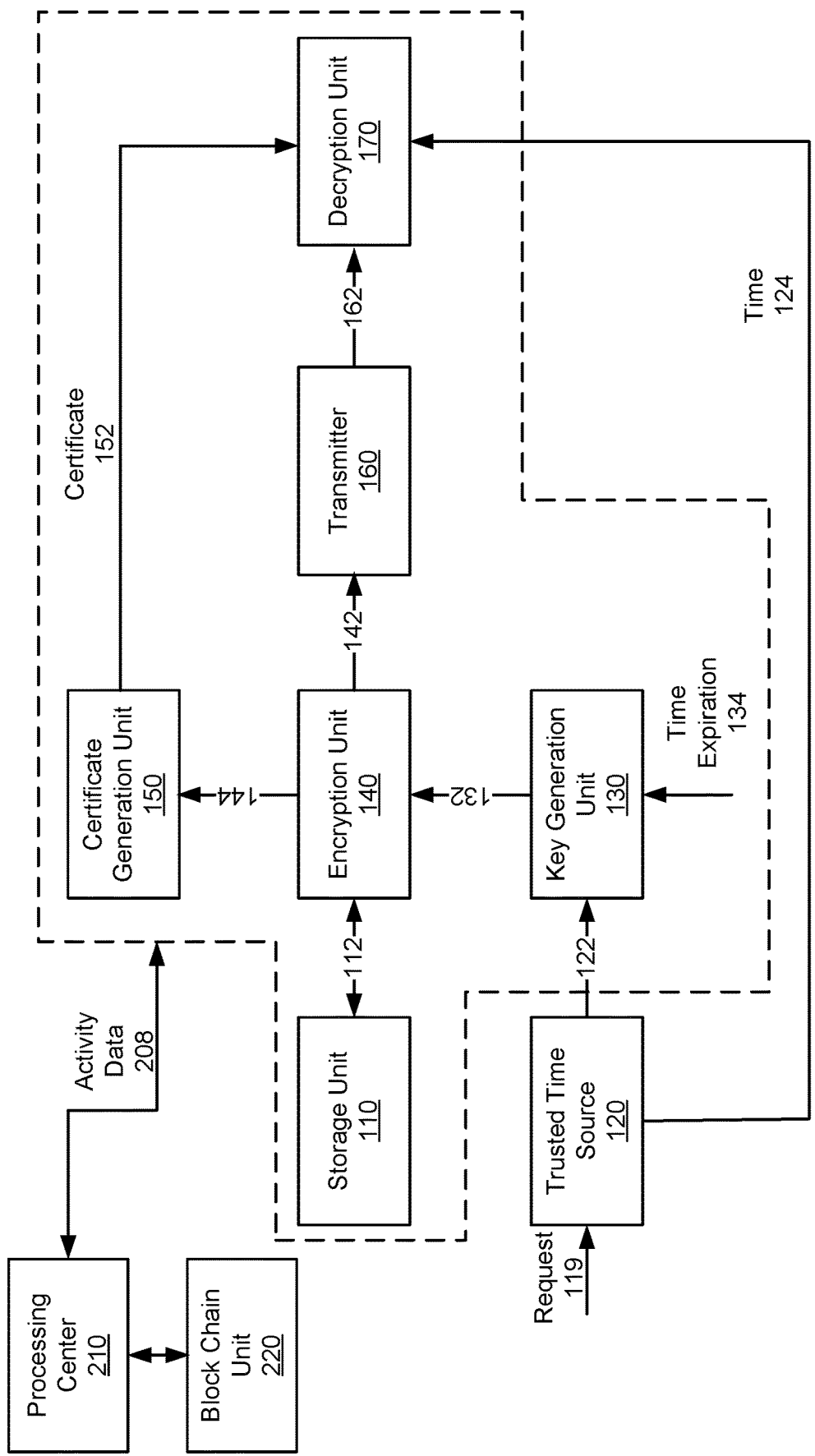
FIG. 2 shows another system for generating an encryption key for encrypting data that expires after a certain period of time and a system for logging activities in a block chain according to one aspect of the present embodiments.

Referring now to FIG. 2, another system for generating an encryption key for encrypting data that expires after a certain period of time and a system for logging activities in a block chain, e.g., private chain where trust is ensured by the certificate generation unit used to sign each block in some examples, according to one aspect of the present embodiments is shown. FIG. 2 is substantially similar to that of FIG. 1. However, in some embodiments, activities related to the data, e.g., data stored within the storage unit 110, data encryption by the encryption unit 140, key generation by the key generation unit 130 to encrypt the data, certificate generation by the certificate generation unit 150, transmission of encrypted data by the transmitter 160, request to decrypt the encrypted data by the decryption unit 170, etc. may be tracked by generating blocks within a block chain. It is appreciated that some or all of the activities may be tracked. In some embodiments, the storage unit 110, the key generation unit 130, the encryption unit 140, the certificate generation unit 150, the transmitter 160, and the decryption unit 170, or any combination thereof may transmit data 208 related to activities, e.g., data access request, data encryption, certificate generation, key such as encryption/decryption key generation, data transmission, data decryption, data decryption denial, etc., to a processing center 210 to generate blocks of the block chain. The processing center 210 receives activity data 208, e.g., chronologically in time, and processes the received information before transmitting it to the block chain unit 220 such that the processed data can be encrypted as blocks within the block chain.

It is appreciated that the activity data 208 generated by the storage unit 110, the encryption unit 140, the key generation unit 130, the certificate generation unit 150, the transmitter 160, the decryption unit 170, or any combination thereof, is processed by the processing center 210. The processed data may be encrypted in a cryptographically secure manner via the block chain unit 220, using a block chain technology. Moreover, the block chain unit 220 may encrypt the private information in a cryptographically secure manner. According to some embodiments, a layered block chain may be used where a more sensitive data, e.g., private information, may be encrypted in such a fashion that the data is not visible to public or unauthorized user while encrypting non-sensitive data, e.g., operational data of the storage medium enterprise system, in such a fashion that makes the data visible to public. For example, a cryptographic one-way function, e.g., hash function, password-based key derivation function 2, pseudorandom function such as SHA256, etc., may be used to encrypt the private information such that the content of the private information is kept private even if the block chain is made public. In some embodiments, the proof and/or meta data associated with the private information may be included in the attestation for the block chain but not the actual content of the private information itself such that when published the private information is kept private.

The data once encrypted is appended to the end of the block chain and prior data within the block chain is prevented from being modified without breaking the block chain. It is appreciated that the block chain unit 220 may initially use a hardware root key in order to instantiate the block chain. The hardware root key is a unique key for each component, e.g., a hard drive, a solid state drive, etc. It is, however, appreciated that the block chain may be instantiated in any fashion, e.g., a random number generation may be used as the root key.

In some embodiments, the block chain data is transmitted from the block chain unit 220 to the processing center 210. The processing center 210 may access the block chain and process the data, e.g., activity data associated with the storage unit 110, the encryption unit 140, the key generation unit 130, the certificate generation unit 150, the transmitter 160, the decryption unit 170, or any combination thereof, as long as the processing center 120 is authorized to do so. For example, the processing center 210 may decrypt the encrypted data of the block chain, if authorized to do so, in order to process the data. It is appreciated that a permissioned block chain may be used in order to control access to the network, and therefore the block chain. The processed data by the processing center 210 may be transmitted to the block chain unit 220 to be encrypted as a block within the block chain. It is appreciated that in some embodiments, the processing center 210 and the block chain unit 220 may be within an integrated unit. It is appreciated that the newly added block of the block chain may be propagated to all the nodes in order to update the block chain at each node.

It is appreciated that more data may be generated by the storage unit 110, the encryption unit 140, the key generation unit 130, the certificate generation unit 150, the transmitter 160, the decryption unit 170, or any combination thereof, and may be appended as a block of the block chain, as described above. The appended block and the updated block chain are propagated to other nodes.

Accordingly, a block chain is created. The block chain grows over time as more data is created and/or processed. The blocks of the block chain are linked in a secure fashion using cryptography and may contain a hash pointer as a link to its previous block, a timestamp, and the data. It is appreciated that in some embodiments, activity data, processed data, etc., may be hashed and encoded into a Merkle tree. As such, each block may include a hash of its prior block in the block chain, thereby linking the two blocks. Thus, the integrity of previous blocks may be confirmed. Moreover, access to data may be controlled and tracked. As such, access to data may be revoked by the system administrator since every entity that has access to the data can be tracked using block chain.

Accordingly, activity data generated at times $t_1$, $t_2$, $t_3$, $t_4$, etc., may be encrypted into blocks of the block chain. The block chain may be updated throughout the nodes within the network. Thus, data access and various activities may be tracked.

Figure 3:
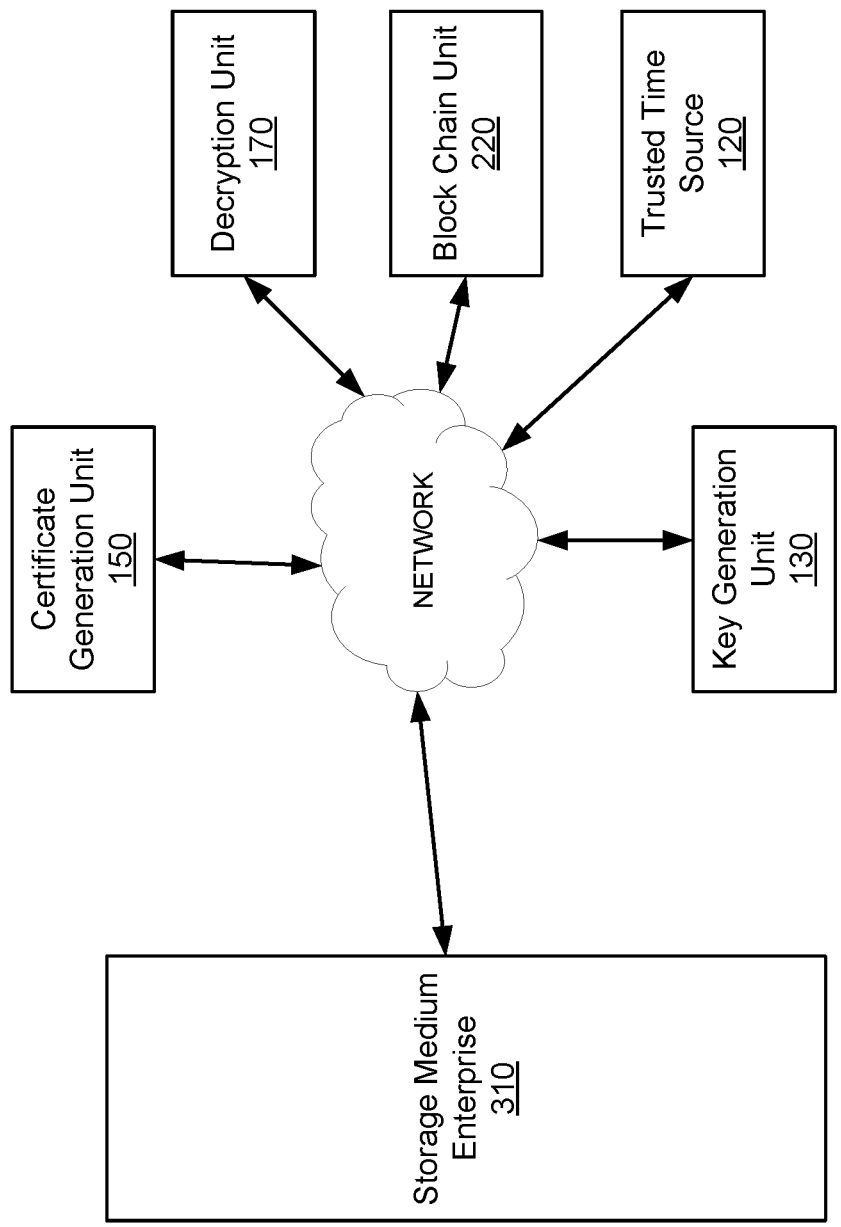
FIG. 3 shows yet another system for generating an encryption key for encrypting data that expires after a certain period of time and a system for logging activities in a block chain according to one aspect of the present embodiments.

Referring now to FIG. 3, yet another system for generating an encryption key for encrypting data that expires after a certain period of time and a system for logging activities in a block chain according to one aspect of the present embodiments is shown. FIG. 3 is substantially similar to that of FIG. 2. However, in this embodiment, the storage unit 110 is replaced with a storage medium enterprise 310 that may include a plurality of hard drives, a plurality of flash drives, etc. The storage medium enterprise 310 is coupled to the certificate generation unit 150, the decryption unit 170, the block chain unit 220, the trusted time source 120, and the key generation unit 130 via a network. The storage medium enterprise 310 may include the encryption unit integrated therein. The encryption unit integrated within the storage medium enterprise 310 may be substantially similar to the encryption unit 140.

Figure 4A:
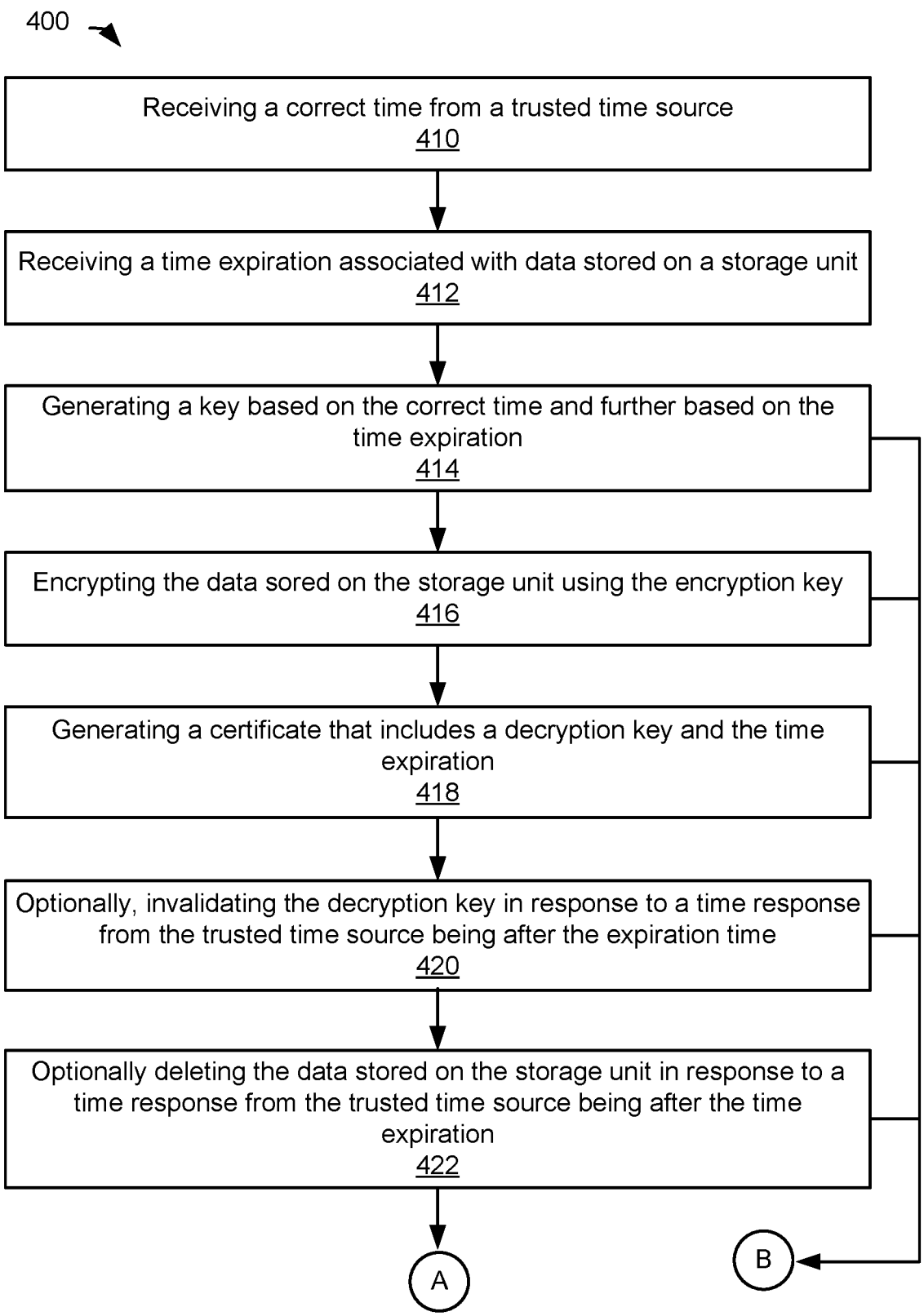
FIGS. 4A-4B show an illustrative method for generating an encryption key for encrypting data that expires after a certain period according to one aspect of the present embodiments.
Figure 4B:
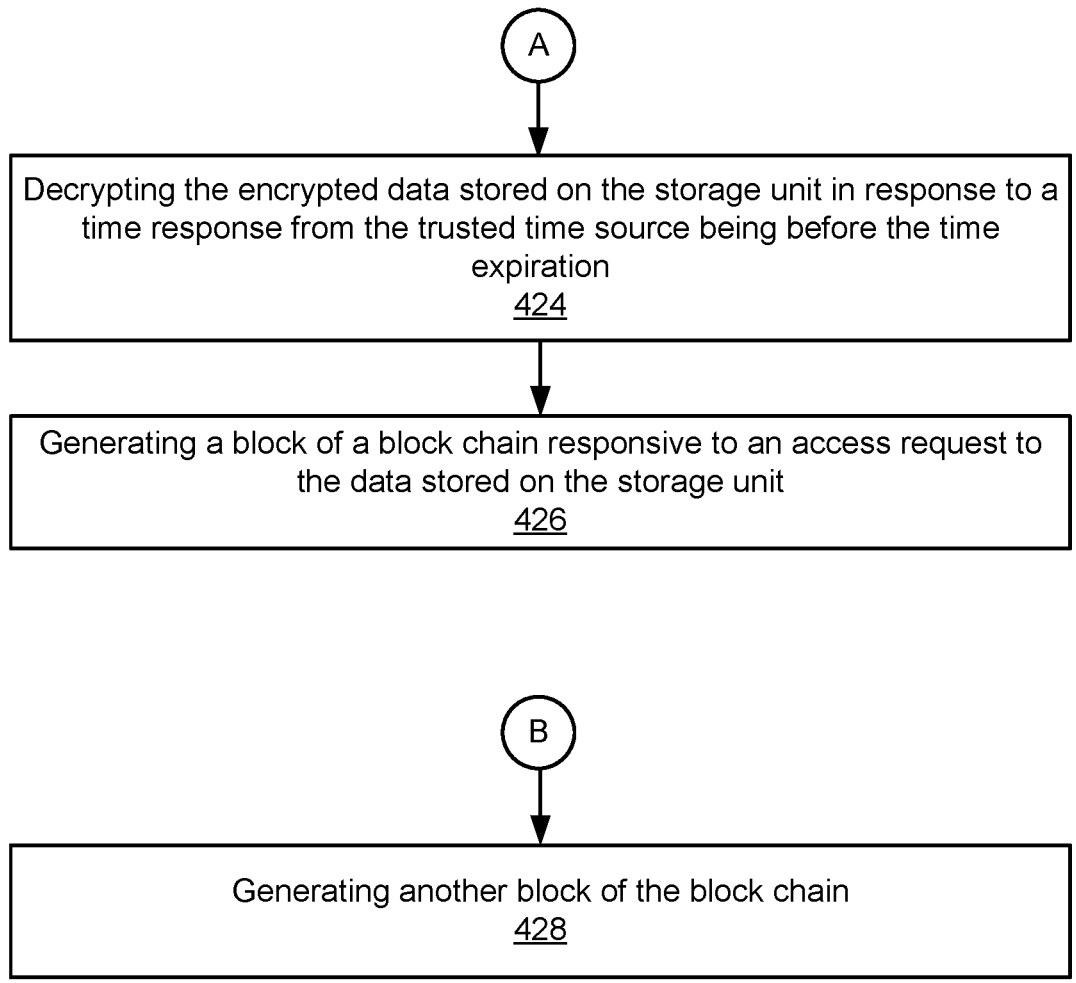

Referring now to FIGS. 4A-4B, an illustrative method 400 for generating an encryption key for encrypting data that expires after a certain period according to one aspect of the present embodiments is shown. At step 410, a correct time is received from a trusted time source, as described above. At step 412, a time expiration that is associated with the data stored on a storage unit may be received, e.g., from a user, as described above. At step 414, a key, e.g., encryption/decryption key, is generated based on the correct time received and further based on the time expiration. At step 416, the data stored on the storage unit is encrypted using the encryption key that has been generated. At step 418, a certificate that includes an encryption/decryption key as well as the time expiration may be generated. A request to decrypt the encrypted data may be received. At step 420, optionally, the decryption key may be invalidated or deactivated in response to a time response from the trusted time source being after the expiration time. At step 422, optionally, the data stored on the storage unit is deleted in response to a time response from the trusted time source being after the time expiration.

Accordingly, the encrypted data is only accessible before the expiration of the time expiration. After time expiration the data may be deleted or otherwise become inaccessible by deactivating or invalidating the encryption/decryption key.

At step 424, the encrypted data is decrypted in response to a time response from the trusted time source being before the time expiration. In some embodiments, at step 426, a block of a block chain is generated responsive to an access request, e.g., encryption, decryption, etc., to the data stored on the storage unit. It is appreciated that at step 428, other blocks of the block chain may further be generated activities related to steps 414-422 or any combination thereof. Accordingly, activity data generated at times $t_1$, $t_2$, $t_3$, $t_4$, etc., may be encrypted into blocks of the block chain. The block chain may be updated throughout the nodes within the network. Thus, data access and various activities may be tracked.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A system comprising:
a storage unit comprising a computer storage media that stores data; and
one or more processors operable to:
receive a time expiration associated with the data stored on the storage unit wherein the time expiration indicates when the data stored on the storage unit is to become inaccessible;
receive a correct time from a trusted time source and generate an encryption key based on the correct time and further based on the time expiration;
use the encryption key to encrypt the data stored on the storage unit; and
responsive to the data stored on the storage unit being encrypted, generate a certificate that includes a decryption key associated with the encryption key and that further includes the time expiration.

2. The system as described in claim 1, wherein the one or more processors are further operable to:
request a time response from the trusted time source;
access the decryption key;
compare the time response from the trusted time source to the time expiration; and
responsive to the time response being before the time expiration, decrypt the encrypted data stored on the storage unit using the decryption key.

3. The system as described in claim 1, wherein the one or more processors are further operable to:
request a time response from the trusted time source;
access the decryption key; and
compare the time response from the trusted time source to the time expiration, wherein the decryption key becomes invalid responsive to the time response being after the time expiration, and wherein invalidation of the decryption key makes the data stored on the storage unit inaccessible.

4. The system as described in claim 1, wherein the decryption key becomes invalid responsive to a time response from the trusted time source being after the time expiration, and wherein invalidation of the decryption key makes the data stored on the storage unit inaccessible.

5. The system as described in claim 1, wherein the data stored on the storage unit is erased responsive to a time response from the trusted time source being after the time expiration.

6. The system as described in claim 1, wherein access request to the encrypted data stored on the storage unit is recorded as a block within a block chain.

7. The system as described in claim 1, wherein a decryption attempt of the encrypted data stored on the storage unit is recorded as a block within a block chain.

8. The system as described in claim 1, wherein the trusted time source is RFC3161 time stamp compliant.

9. A method comprising:
receiving a correct time from a trusted time source;
receiving a time expiration associated with data stored on a storage unit, the time expiration indicating when the data is to become inaccessible;
generating a key based on the correct time and further based on the time expiration;
encrypting the data stored on the storage unit using the encryption key; and
responsive to the data stored on the storage unit being encrypted, generating a certificate, wherein the certificate includes a decryption key associated with the encryption key and further includes the time expiration.

10. The method as described in claim 9 further comprising:
invalidating the decryption key in response to a time response from the trusted time source being after the time expiration.

11. The method as described in claim 9 further comprising:
deleting the data stored on the storage unit in response to a time response from the trusted time source being after the time expiration.

12. The method as described in claim 9 further comprising:
decrypting the encrypted data stored on the storage unit in response to a time response from the trusted time source being before the time expiration.

13. The method as described in claim 9 further comprising:
generating a block of a block chain responsive to an access request to the data stored on the storage unit.

14. The method as described in claim 9 further comprising:
generating a block of a block chain responsive to a decryption attempt of the encrypted data stored on the storage unit.

15. A system comprising:
a storage unit comprising a computer storage media that stores data; and
one or more processors operable to:
receive a time expiration associated with the data stored on the storage unit, wherein the time expiration indicates when the data stored on the storage unit is to become inaccessible;
receive a correct time from a trusted time source;
generate an encryption key based on the correct time and further based on the time expiration;
use the encryption key to encrypt the data stored on the storage unit; and
responsive to the data stored on the storage unit being encrypted, generate a certificate that includes a decryption key associated with the encryption key and that further includes the time expiration.

16. The system as described in claim 15, wherein the one or more processors are further operable to:
request a time response from the trusted time source;
access the decryption key;
compare the time response from the trusted time source to the time expiration; and
responsive to the time response being before the time expiration, decrypt the encrypted data stored on the storage unit using the decryption key.

17. The system as described in claim 15, wherein the one or more processors are further operable to:
request a time response from the trusted time source;
access the decryption key; and
compare the time response from the trusted time source to the time expiration, wherein the decryption key becomes invalid responsive to the time response being after the time expiration, and wherein invalidation of the decryption key makes the data stored on the storage unit inaccessible.

* * * * *